(12) United States Patent
Lepage

(10) Patent No.: US 10,336,390 B2
(45) Date of Patent: Jul. 2, 2019

(54) TWO-WHEELER STANDING VEHICLE

(71) Applicant: Jérémie Lepage, Montréal (CA)

(72) Inventor: Jérémie Lepage, Montréal (CA)

(*) Notice: Subject to any disclaimer, the term of this patent is extended or adjusted under 35 U.S.C. 154(b) by 0 days.

(21) Appl. No.: 15/567,348

(22) PCT Filed: Apr. 15, 2016

(86) PCT No.: PCT/CA2016/000120
§ 371 (c)(1),
(2) Date: Oct. 17, 2017

(87) PCT Pub. No.: WO2016/165008
PCT Pub. Date: Oct. 20, 2016

(65) Prior Publication Data
US 2018/0162477 A1    Jun. 14, 2018

(30) Foreign Application Priority Data
Apr. 17, 2015  (CA) ...................... 2888318

(51) Int. Cl.
*B62K 3/00* (2006.01)
*B62J 25/00* (2006.01)
(Continued)

(52) U.S. Cl.
CPC .............. *B62K 3/002* (2013.01); *B62J 25/00* (2013.01); *B62K 3/10* (2013.01); *B62K 19/40* (2013.01);
(Continued)

(58) Field of Classification Search
CPC ......... B62B 3/002; B62K 3/002; B62K 3/10; B62K 19/40; B62K 2208/00; B62K 2204/00; B62J 25/00; B62M 6/90
See application file for complete search history.

(56) References Cited

U.S. PATENT DOCUMENTS 9,321,507 B2 * 4/2016 Dodds ...................... B62M 1/14
9,440,699 B1 * 9/2016 Wittorf ................ B62K 15/006
(Continued)

FOREIGN PATENT DOCUMENTS

| CN | 201062073 | 5/2008 |
|---|---|---|
| DE | 29516837 | 1/1996 |

(Continued)

OTHER PUBLICATIONS

International Search Report in International Application No. PCT/CA2016/000120, "Two-Wheeler Standing Vehicle," dated Jul. 26, 2016.

(Continued)

*Primary Examiner* — James A Shriver, II
*Assistant Examiner* — James J Triggs
(74) *Attorney, Agent, or Firm* — Gowling WLG; Benoit Yelle

(57) ABSTRACT

A two-wheeler vehicle comprising a steerable front wheel of at least 16" ($d_f$), a fixed back wheel smaller than or equal ($d_b$) to $d_f$. A distance between the back wheel ground contact point and the front wheel contact point is smaller than or equal to $(12"+\sqrt{(d_f d_b)})$. A steering mechanism defines a steering axis ground contact point. A trail distance between the steering axis ground contact point and the front wheel ground contact point is between 5% and 10% of the $d_f$. The steering mechanism comprises a fork, a yoke and a handlebar. A frame interconnects the yoke and the center of the back wheel and comprises a standing mechanism providing at least one footboard, below the back wheel center, extending laterally from the frame.

23 Claims, 10 Drawing Sheets

(51) Int. Cl.
*B62K 3/10* (2006.01)
*B62K 19/40* (2006.01)
*B62M 6/90* (2010.01)

(52) U.S. Cl.
CPC ...... *B62K 2204/00* (2013.01); *B62K 2208/00* (2013.01); *B62M 6/90* (2013.01)

(56) References Cited

U.S. PATENT DOCUMENTS

| | | |
|---|---|---|
| 2003/0132592 A1 | 7/2003 | Dombroski |
| 2008/0061529 A1 | 3/2008 | Schmautz |
| 2008/0217085 A1 | 9/2008 | Wernli |
| 2010/0059955 A1 | 3/2010 | Steinbach |

FOREIGN PATENT DOCUMENTS

| | | |
|---|---|---|
| FR | 2555116 | 5/1985 |
| FR | 2716859 | 9/1995 |
| WO | WO 2015004039 | 1/2015 |

OTHER PUBLICATIONS

Written Opinion in International Application No. PCT/CA2016/000120, "Two-Wheeler Standing Vehicle," dated Jul. 26, 2016.

* cited by examiner

TWO-WHEELER STANDING VEHICLE

PRIORITY STATEMENT

This non-provisional patent application is U.S. national phase entry from the PCT patent application PCT/CA2016/000120 entitled "TWO-WHEELER STANDING VEHICLE", filed on 2016 Apr. 17, in the name of LEPAGE, Jérémie, and the PCT patent application claims priority based upon the prior Canadian patent application entitled "COMPACT SCOOTER", application number 2,888,318, filed on 2015 Apr. 17, in the name of LEPAGE, Jérémie, both the PCT application and Canadian patent application being herein incorporated by reference in their entirety.

TECHNICAL FIELD

The present invention relates to a two-wheeler vehicle and, more particularly, to a standing two-wheeler vehicle.

BACKGROUND

The two common standing two-wheeler vehicles known in the prior art are scooters and kick-bikes.

A scooter is a two-wheeler vehicle comprising a longitudinal footboard between a front wheel and a back wheel. The assembly is controlled by an upright steering post coupled to the front wheel that the user grasps by a steering handle attached to the steering post. A rider stands on the scooter by resting one foot on the footboard and puts the scooter in motion by pushing the road with the other foot.

A kick-bike is another type of two-wheeler vehicle with larger wheels than the scooter. As with the scooter, the kick-bike comprises a longitudinal footboard between a front wheel and a back wheel. The assembly is controlled by an upright steering post coupled to the front wheel that the user grasps by a steering handle attached to the steering post. A rider stands on the scooter by resting one foot on the footboard and puts the scooter in motion by pushing the road with the other foot. A standard kick-bike has wheels the same size as bicycle wheels. A scooter typically has wheels that are much smaller than bicycle wheels—in some cases, they may even be as small as skateboard wheels.

The present invention aims at providing a stable and maneuverable two-wheeler vehicle.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A first aspect of the present invention is directed to a two-wheeler vehicle comprising a steerable front wheel, a fixed back wheel, a steering mechanism and a frame. The steerable front wheel has a front wheel diameter $d_f$ of at least 16" or 400 mm. The front wheel defines a front rotation plane when neutrally steered and defines a front wheel ground contact point. The fixed back wheel has a back wheel diameter $d_b$ smaller than or equal to the front wheel diameter. The back wheel defines a back rotation plane coincident with the front rotation plane and defines a back wheel ground contact point. A distance between the back wheel ground contact point and the front wheel contact point is smaller than or equal to (12" or 300 mm+$\sqrt{d_f d_b}$). The steering mechanism defines a steering axis intersecting ground at a steering axis ground contact point. A trail distance between the steering axis ground contact point and the front wheel ground contact point is between 5% and 10% of the front wheel diameter. The steering mechanism comprises a fork engaging the front wheel at a front wheel center thereof, a yoke and a handlebar mechanically linked to the fork via the yoke for steering the front wheel. The frame interconnects the yoke and the back wheel at a back wheel center thereof and comprises a standing mechanism providing at least one footboard, below the back wheel center, extending from the frame laterally.

Optionally, the front wheel diameter may be at least 30% larger than the back wheel diameter. Optionally, the at least one footboard may extend laterally over the back wheel on at least 25 mm or about 1". Two footboard may optionally be provided laterally over each side of the back wheel for a passenger can stand thereon. Optionally, the at least one footboard may be configured to swivably retract towards the frame. The at least one footboard may then comprise two footboards on respective sides of the back wheel, each being configured to independently retract towards the frame. Retraction of the at least footboard may optionally be aided by one or more mechanical components.

A foot resting surface of the at least one footboard may be at a maximum ground distance of 300 mm or about 12", preferably at a maximum ground distance of 150 mm or about 6".

The two-wheeler may optionally further comprise one or more motors for driving the back wheel. The motor(s) may be mounted on the frame and/or on the back wheel. One or more motors may also be provided, mounted on the front wheel, for driving the front wheel.

A battery pack may optionally be mounted on the frame and one or more motor actuators may further be provided. A center of mass thereof may further be located between the front wheel ground contact point and the back wheel ground contact point, preferably between the front wheel and the back wheel. The battery pack may be detachably mounted to the frame. The battery pack may, alternatively or in addition, be distributed in different sections of the frame. A motor controller may optionally be mounted in one or more locations on the frame for driving the one or more motors. The one or more motor actuators may optionally be mounted on at least one of the handlebar, the frame and the at least one footboard.

The two-wheeler vehicle may further comprise a brake mechanism comprising at least a magnetic brake on the back and/or front wheel(s) and one or more brake actuators. The brake mechanism may also comprise, alternatively or in addition, friction brakes on at least one of the front wheel and the back wheel. The one or more brake actuators may be mounted on at least one of the handlebar, the frame and the at least one footboard. The brake mechanism may comprise a disk brake on the back wheel. The two-wheeler vehicle may further comprise a kickstand mounted on the frame.

BRIEF DESCRIPTION OF THE DRAWINGS

Further features and exemplary advantages of the present invention will become apparent from the following detailed description, taken in conjunction with the appended drawings, in which.

DETAILED DESCRIPTION

Figure 1A:
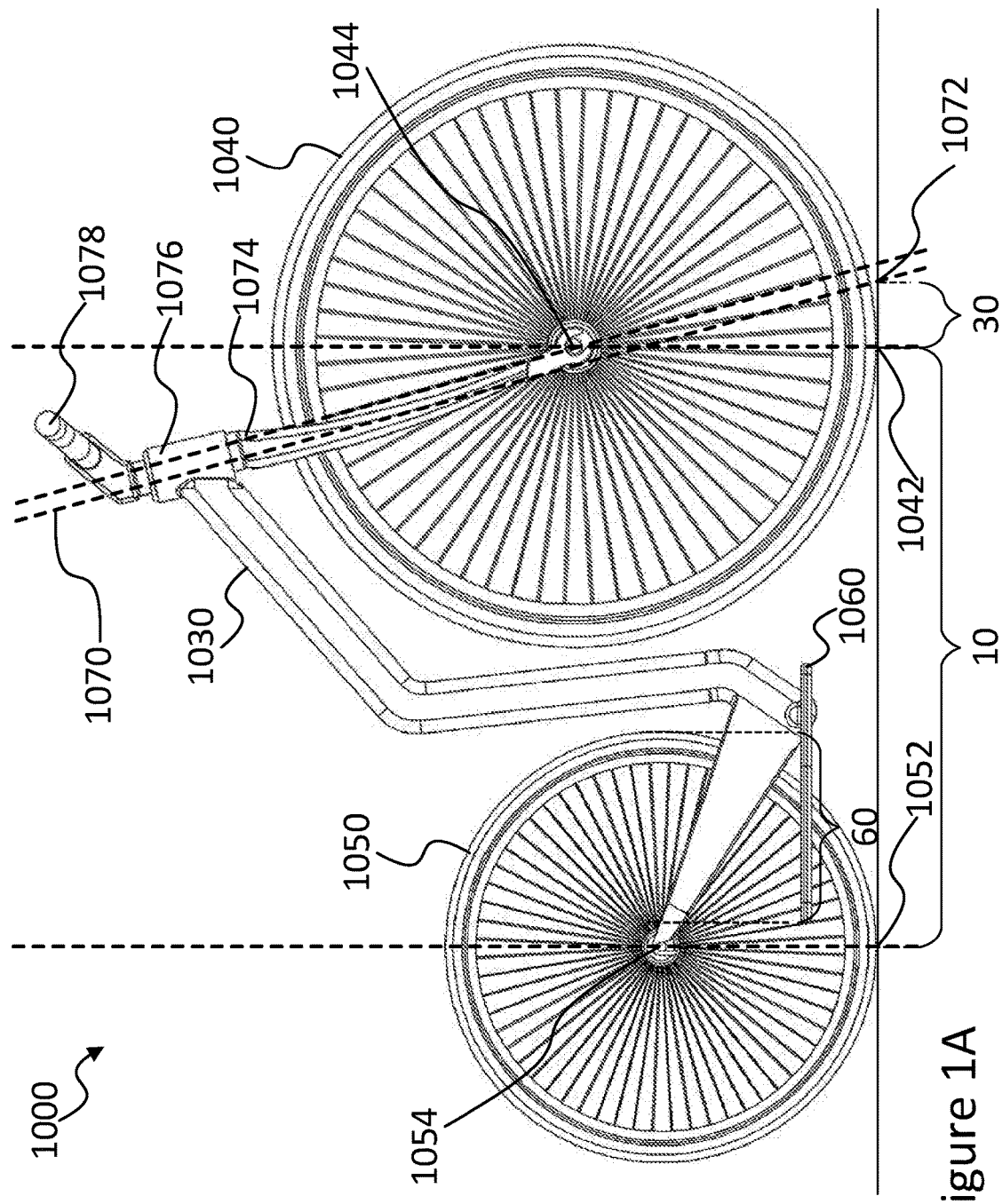
FIGS. 1A and 1B show side views of an exemplary two-wheeler vehicle in accordance with the teachings of the present invention.

A common problem with two-wheeled vehicles is that they fail to optimize both maneuverability and stability. For example, because scooters have small wheels and a short distance between the front wheel and the back wheel, they are maneuverable and have a short turning radius. They are, however, not stable. The wheels are too small to roll over medium or large obstacles, and because of the size of the wheels, vibrations are transmitted to the footboard and the handlebar. Kick-bikes, by contrast, are more stable but less maneuverable. The larger wheels on kick-bikes enable them to roll over obstacles on uneven terrain. However, because the wheels are larger and spaced farther apart to provide enough room for the longitudinal footboard, the large distance between the front and back wheels reduces the maneuverability of kick-bikes and increases their turning radius. As a further drawback to kick-bikes, their larger size makes it difficult to transport and store them. As a result, scooters are ill-suited to uneven terrain, and kick-bikes are ill-suited to urban settings, where maneuverability and a short turning radius are important.

A preferred embodiment of the present invention is a two-wheeler vehicle comprising a fixed back wheel, a steerable front wheel, a steering mechanism, and a frame. The steering mechanism comprises a fork engaging the front wheel at the center of the front wheel, a yoke, and a handlebar mechanically linked to the fork via the yoke for steering the front wheel. In the preferred embodiment, the frame is S-shaped and made of light-weight alloy of approximately 50 mm diameter or about 2". The S-shaped frame interconnects the yoke and the back wheel at the center of the back wheel. The S-shaped frame comprises three sections. The first section of the frame connects with the yoke and extends downward over the front wheel towards the back wheel. The second section of the frame extends downward from the first section of the frame approximately perpendicular to the ground between the front and the back wheel. The third section extends from the second section to the center of the back wheel. In the preferred embodiment, two footboards are provided below the center of the back wheel, near the junction of the second and third sections of the S-shaped frame. Each of the two footboards extend from the frame laterally respectively over each side of the back wheel. In the preferred embodiment, the fixed back wheel has a diameter of 16" or about 400 mm. The front wheel has a diameter of 700 mm or about 27½". The distance between the ground contact point of the front wheel and the ground contact point of the back wheel is about 750 mm. The steering mechanism's trail (i.e., the distance between the steering axis' ground intersection point and the ground contact point of the front wheel) is approximately 45 mm. The suggested design provides a balanced of maneuverability and stability. The design is stable because the front and back wheels are large and approximately the same size as standard bicycle or kick-bike wheels. The design is maneuverable because the distance between the front and back wheels is relatively short and the trail is relatively small. The distance between the two wheels is closer to the distance between the wheels on a scooter than the distance between the wheels on a kick-bike. On kick-bikes, the wheels cannot be placed close together because there is a longitudinal footboard between the two wheels. The suggested design addresses this shortcoming by replacing the longitudinal footboard between the two wheels with two footboards lateral to the frame extending over the back wheel. The suggested design therefore has a shorter turning radius than a standard kick-bike, and because of its smaller size is more easily stored and transported. A rider uses the two-wheeled vehicle by placing one foot on one of the two footboards and putting the vehicle in motion by pushing the ground with the other foot.

Figure 1B:
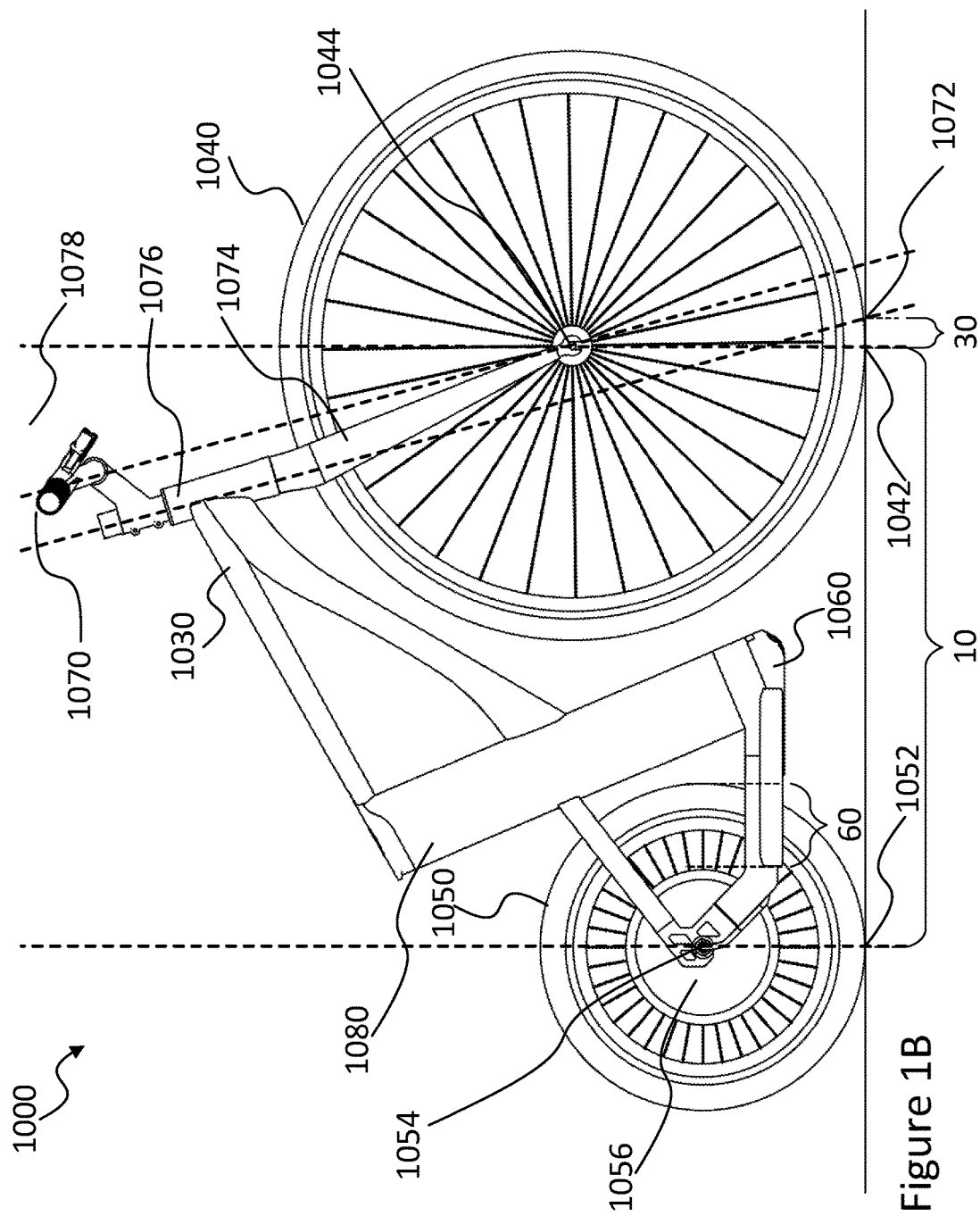

Reference is made to the drawings in which FIGS. 1A and 1B, which show a perspective view of exemplary two-wheeler vehicles 1000 comprising a steerable front wheel 1040 having a front wheel diameter greater than or equal to 16" or about 400 mm. The two-wheeler vehicle further comprises a fixed back wheel 1050 having a back wheel diameter at least equal to the front wheel diameter. The back wheel 1050 defines a back rotation plane and a back wheel ground contact point 1052. It is expected that a diameter of the back wheel 1050 up to 700 mm or about 27½" and a diameter of up to 29" or about 725 mm for the front wheel 1040 would still provide interesting results. Skilled people will readily be able to determine the maximum workable diameters while applying the teachings of the present invention.

The front wheel 1040 defines a front rotation plane coincident with the back rotation plane when neutrally steered and a front wheel ground contact point 1042. A distance 10 between the back wheel ground contact point 1052 and front wheel ground contact point 1042 is smaller than or equal to:

$$(12" \text{ or } 300 \text{ mm} + \sqrt{d_f \cdot d_b})$$

For instance, when both wheels 1040, 1050 have a diameter of 29", the maximum distance 10 would be 41". With diameters of 16" (400 mm) and 700 mm (27½") respectively for the back wheel 1050 and the front wheel 1040, the maximum distance 10 is about 829 mm or about 32⅝". The minimum distance 10 before the wheel touch each other is $\sqrt{d_f \cdot d_b}$. In some embodiments, only 8" or only 4" is added to the minimum distance. It is expected that the adding 10 mm (or about ⅜.) on each side of the frame would be sufficient. In a preferred set of embodiments, the front wheel 1040 is similar in size to a bicycle wheel or kick-bike wheel. A person skilled in the art will understand that having such a large front wheel 1040 improves shock and vibration absorption. The greater the size of a wheel, the lower the angle of impact. For example, if a wheel with a diameter of 26" hits a 6" obstacle, the angle of impact would be 30.6°. If a wheel with a diameter of 27.5" were to hit the same obstacle, the angle of impact would be 30.1°. And as a particularly extreme example, if a wheel with a 6" diameter were to hit the same 6" obstacle, the angle of impact would be 90°. The lower the angle of impact, the lower the resulting shock and vibrations will be from hitting an obstacle. The front wheel 1040 is therefore large in order to minimize shocks and vibrations.

The smaller back wheel 1050 may facilitate getting on and off the two-wheeler vehicle (e.g., the larger the back wheel 1050, the higher the rider has to lift his or her leg to get on and off the two-wheeler vehicle). The smaller back wheel also allows for the distance 10 to be smaller. The smaller back wheel 1050 also contributes to improve the acceleration of the two-wheeler vehicle 1000 in the embodiment where the two-wheeler vehicle 1000 has a motor (shown on Figure B) engaged with the back wheel 1050. A person skilled in the art will understand that the magnitude of torque depends on two quantities: τ=r×F. τ represents the magnitude of the torque, which in the case of a motor is a constant value associated to the design of the motor; r represents the distance between the origin of the coordinate system and the point where the force is applied, which in our case is the radius of the back wheel 1050; and F represents the magnitude of the acceleration force. In other words, F=τ/r. This implies that the smaller the back wheel 1050, the larger the acceleration force; and the larger the acceleration force, the larger the acceleration of the two-wheeler vehicle 1000. A person skilled in the art will therefore understand that, in embodiments where the two-wheeler vehicle 1000 is equipped with a motor attached to the back wheel 1050, greater acceleration will be obtained the smaller the back wheel 1050. Although the back wheel 1050 is smaller than the front wheel 1040, it is nonetheless larger than typical wheels on a traditional scooter and therefore has better shock and vibration absorption compared thereto.

The two-wheeler vehicle 1000 has a reduced wheelbase 10. That is, the distance 10 between the back wheel ground contact point 1052 and the front wheel ground contact point 1042 is smaller than or equal to (12" or 300 mm+$\sqrt{d_f d_b}$). The distance A is smaller than on a kick-bike and smaller than most standard bicycles. The reduced wheelbase 10 improves the maneuverability and control of the two-wheeler vehicle 1000. Two-wheeler vehicles such as the one disclosed in the present application must lean during a turn. A person skilled in the art would understand that the angle of lean θ can be calculated using the following formula:

$$\theta = \arctan\left(\frac{v^2}{gr}\right)$$

where v is the forward speed, r is the radius of the turn, and g is the acceleration of gravity. For example, a bike in a 10 m radius steady-state turn at a speed of 10 m/s must have an angle of lean of 45.6°. A person skilled in the art would further appreciate that the radius of the turn can be estimated (within 2% of the exact value) using the following formula:

$$r = \frac{w \cos\theta}{\delta \cos\phi}$$

where r is the approximate radius, w is the wheelbase, θ is the lean angle, δ is the steer angle, and φ is the caster angle of the steering axis. This formula shows that the turning radius of the two-wheeler vehicle 1000 is directly proportional to the wheelbase 10. A smaller wheelbase results in a more maneuverable two-wheeler vehicle 1000. The reduced wheelbase 10 also results in greater control. The closer the center of mass is to the front of the two-wheeler vehicle 1000, the slower the two-wheeler vehicle 1000 has to be moving to maintain balance. Conversely, the closer the center of mass is to the back of the two-wheeler vehicle 1000, the faster the two-wheeler vehicle 1000 has to be moving to maintain its balance. By having the reduced wheelbase 10, the center of mass will be closer to the front of the two-wheeler vehicle 1000, thus enabling the two-wheeler vehicle 1000 to maintain control at a greater range of speeds.

The two-wheeler vehicle 1000 further comprises a steering mechanism 1070, defining a steering axis intersecting ground at a steering axis ground contact point 1072. A trail distance 30 between the steering axis ground contact point 1072 and the front wheel ground contact point 1042 is between 5% and 10% of the diameter of the front wheel 1040, preferably between 6% and 9%. The steering mechanism comprises a fork 1074 engaging the front wheel 1040 at a front wheel center thereof 1044, a yoke 1076, and a handlebar 1078 mechanically linked to the fork 1074 via the yoke 1076 for steering the front wheel 1040. One factor that affects how easy it is to ride the two-wheeler vehicle 1000 is the trail distance 30. As can be appreciated from the depicted example of FIG. 1, the trail distance 30 corresponds to the distance that the front wheel ground contact point 1042 is behind the steering axis ground contact point 1072 (i.e., considering forward movement of the two-wheeler vehicle 1000). The steering axis is the axis about which the entire steering mechanism 1070 pivots. The more trail a two-wheeler vehicle has, the more stable it will feel. However, too much trail can also make a two-wheeler vehicle feel difficult to steer. Trail can be calculated using the following equation:

$$\text{Trail} = \frac{R_w \cos A_h - O_f}{\sin A_h}$$

where $R_w$ is wheel radius, $A_h$ is the head angle measured clockwise from the horizontal, and $O_f$ is the fork offset or rake. The two-wheeler vehicle 1000 uses a standard bicycle fork geometry to ensure that it is self-stable under any circumstances. The two-wheeler vehicle 1000 has a reduced trail 30 to improve control, especially at low speeds. In the preferred embodiment, the trail distance 30 is smaller than 65 mm, preferably approximately 45 mm. In general, the trail distance 30 of the two-wheeler vehicle 1000 can be expressed as 5% to 10% of the diameter of the front wheel 1040. In the preferred embodiment, the front wheel diameter is 700 mm, such that the trail is roughly 6.4% of that diameter.

The two-wheeler vehicle 1000 further comprise a frame 1030, interconnecting the yoke 1020 and the back wheel 1050 at a back wheel center 1054 thereof. The frame 1030 may be made out of any standard bike frame material, such as steel, aluminum alloys, titanium, carbon fiber, thermoplastic, magnesium, scandium, beryllium, bamboo, wood, and combinations thereof. The frame would typically be made of one or more hollow structure of various cross-sections (e.g., ovoid or circular tube, square prisms, etc.).

The frame 1030 of the two-wheeler vehicle 1000 further comprises a standing mechanism 1060 providing at least one footboard, below the back wheel center 1054, extending from the frame 1030 laterally. Having the footboard(s) below the back wheel center 1054 contributes to increased stability. Unlike with traditional scooters and kick-bikes, the two-wheeler vehicle 1000 does not have a longitudinal footboard between the front wheel 1040 and the back wheel 1050. The footboard(s) may also extend(s) laterally over the back wheel 1050 on a distance 60 (e.g., at least 25 mm or 1". Depending on the embodiments, the distance 60 could be enough for a second person (or a passenger) to stand on a backmost portion of the footboards while enough space is left for the user to stand thereon. Skilled person will readily be able to determine an appropriate distance 60 while applying the teachings of the present invention.

The two-wheeler vehicle 1000 may have a single footboard placed laterally on either the right or left side of the frame (e.g., fixed or swivably selectable side). Alternatively, the two-wheeler vehicle 1000 may have two footboards respectively placed laterally on each side of the frame. Without lateral footboard(s), the desired balance of maneuverability and stability of the exemplary two-wheeler vehicle 1000 would not be achieved. The standing mechanism 1060 may also be provided with a retracting mechanism (not shown) to allow lifting of the footboard(s) towards the frame 1030. The retraction could be done manually (e.g., the user lifting one or both of the footboards) or may also be automatic (e.g., through a spring-loaded or motorized mechanism). For instance, the footboard may retract when no load is applied thereto (e.g., instantly or with a certain delay and/or skew rate) or may be locked in place until the user desires to retract one or both of them (e.g., button press). For instance, the user may reengage, and eventually lock footboard(s) in place, by flipping down with a foot before stepping thereon.

The two-wheeler vehicle 1000 provides a combined center of mass (i.e., considering the user) located near the center between the front wheel 1040 and the back wheel 1050 (when riding in straight line). Having the footboard located below the center of the back wheel 1054, and therefore below the front wheel center 1044, contributes to lowering the center of mass. The foot resting surface of the footboard is at a maximum ground distance of 300 mm or about 12", preferably 150 mm or about 6". Skilled person will readily be able to determine the appropriate minimum ground distance, while applying the teachings of the present invention, considering other characteristics of the selected embodiment.

In some embodiments, the two-wheeler vehicle 1000 further comprises one or more motors for driving the back wheel 1050. For instance, a wheel motor 1056 may be mounted on the axis of the back wheel 1050 as depicted on FIG. 1B. Additional motor(s) may alternatively or in addition be mounted (not shown) on the frame 1030 and/or the front wheel 1040.

In some embodiments, the two-wheeler vehicle 1000 further comprises a battery pack 1080 mounted on the frame 1030. The battery pack could be distributed in different sections and/or mounted on different sections of the frame 1030. The battery pack may also be detachably mounted on, or detachably inserted in, one or more sections of the frame 1030. In some embodiments, a center of mass thereof is located between the front wheel ground contact point 1042 and the back wheel ground contact point 1052, preferably between the front wheel 1040 and the back wheel 1050. One or more motor actuators may then be provided, e.g., mounted on the handlebar 1078, the frame 1030 and/or the at least one footboard(s). A motor controller (not shown) may be provided at a single location or distributed within the frame 1030 and/or mounted thereon. The motor controller provides electricity (typically AC) from the battery pack 1080 (typically DC).

In some embodiments, the two-wheeler vehicle 1000 further comprises a brake mechanism on at least one of the front wheel 1040 and the back wheel 1050 and one or more brake actuators. The brake actuator(s) may be mounted on the handlebar 1078, the frame 1030 and the footboard(s). The brake mechanism may comprise a disk brake (not shown) mounted on the back wheel 1050 (e.g., within the same enclosure as the motor 1056) and/or on the front wheel 1040. In some embodiments, the motor also acts as a magnetic brake.

A kickstand (not shown) may also be mounted on the frame 1030.

Figure 2A:
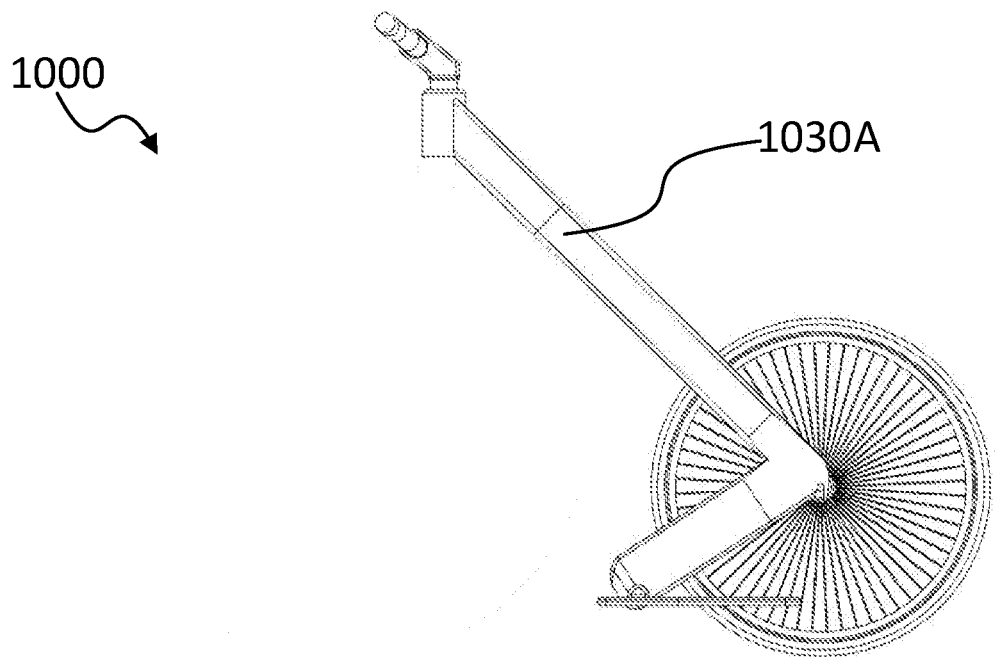
FIGS. 2A to 2K show side views of exemplary frames of a two-wheeler vehicle in accordance with the teachings of the present invention.
Figure 2B:
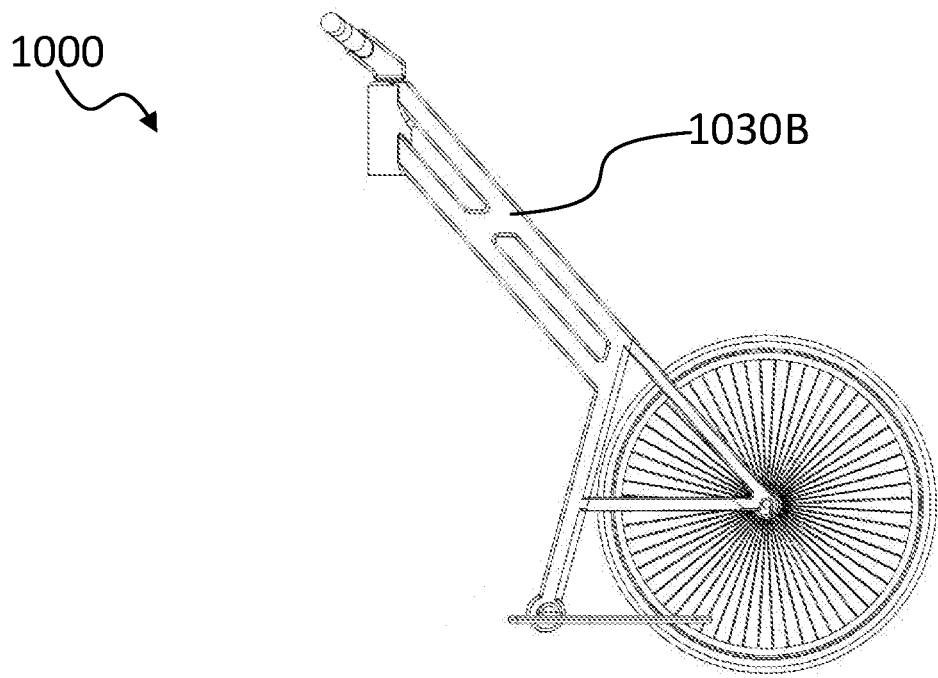
Figure 2C:
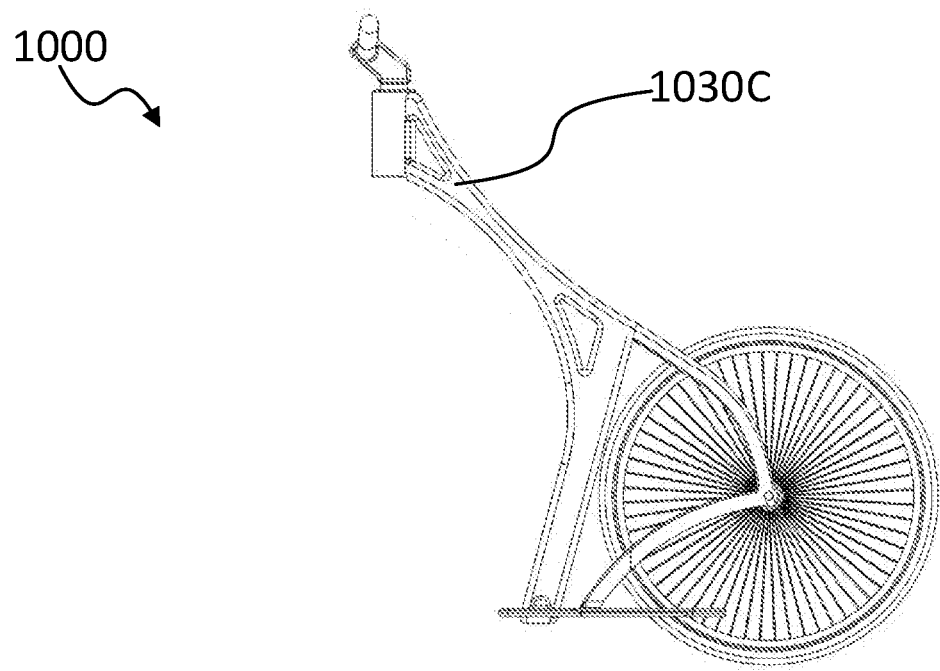
Figure 2D:
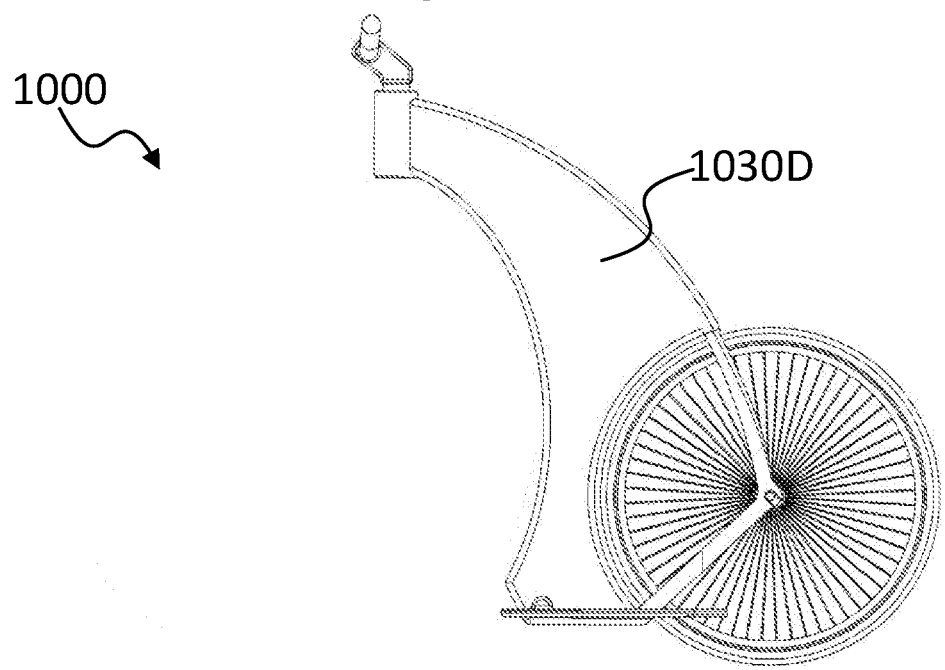
Figure 2E:
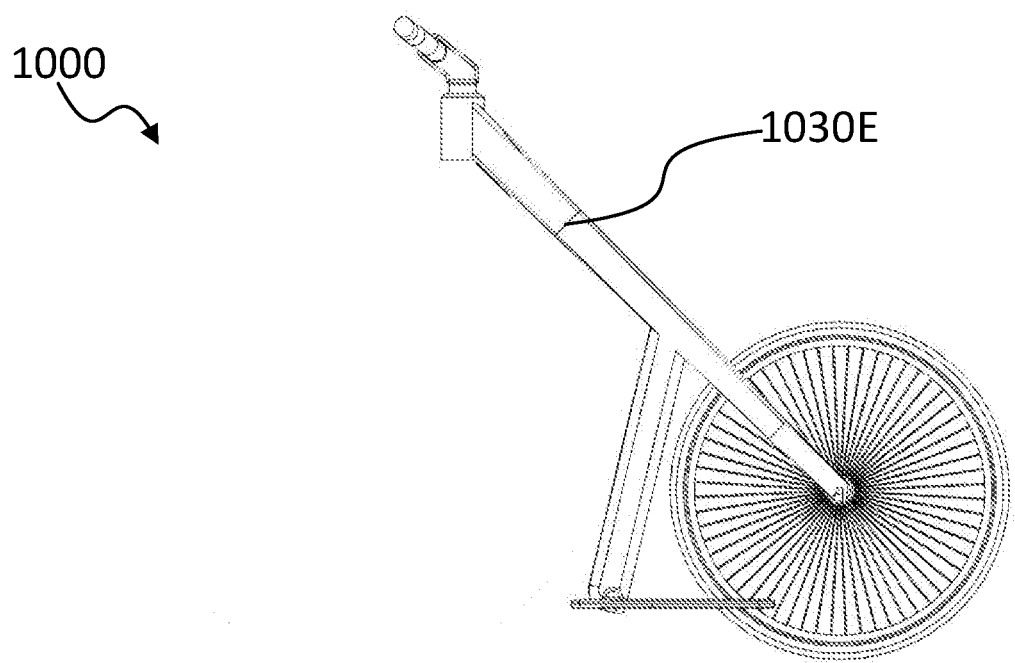
Figure 2F:
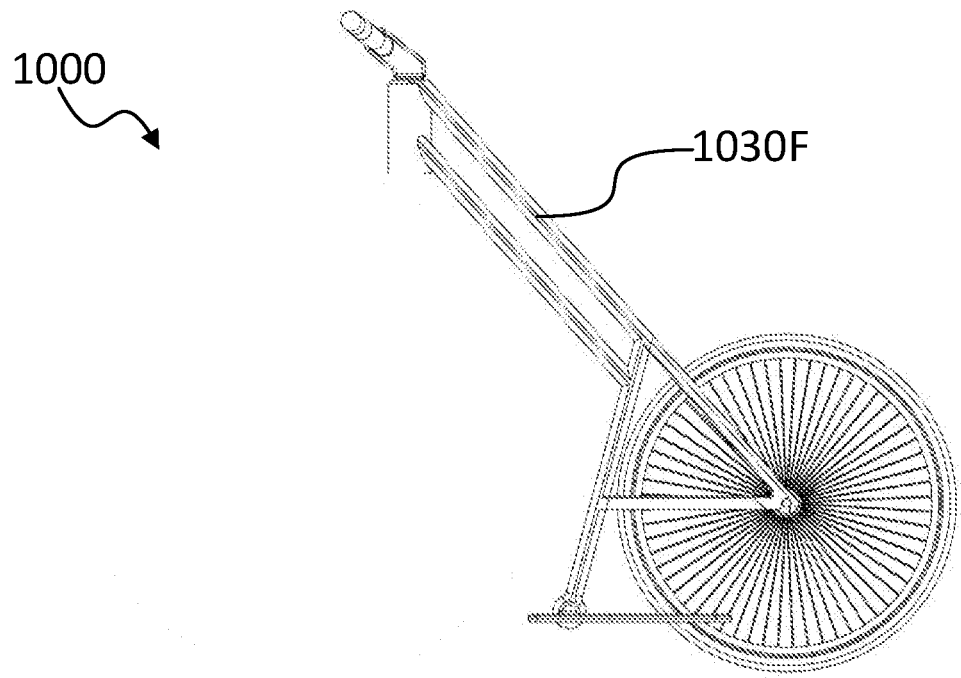
Figure 2G:
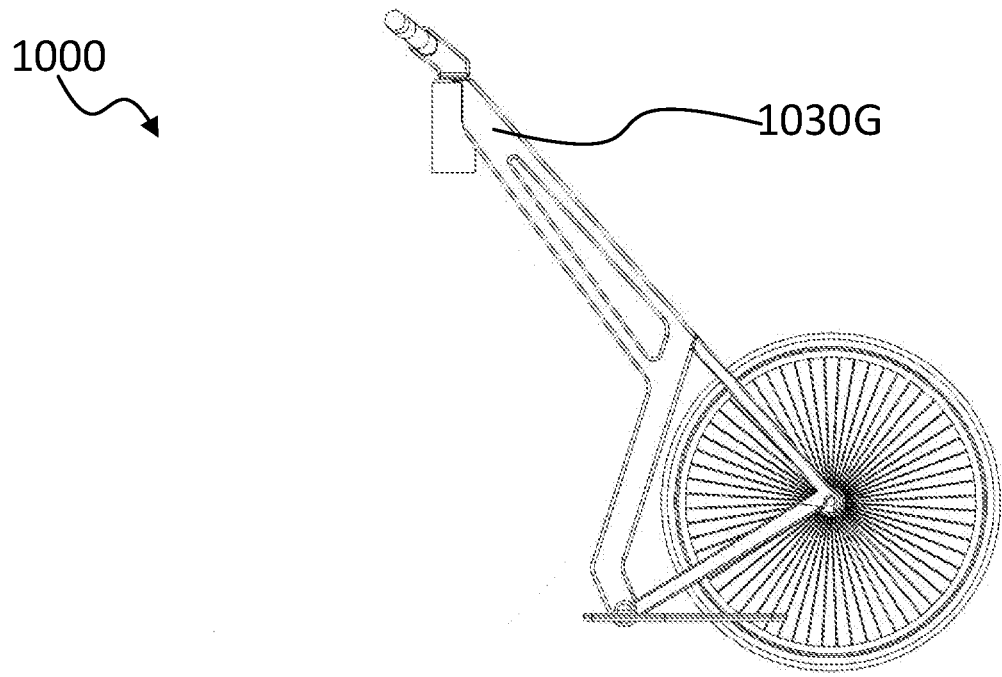
Figure 2H:
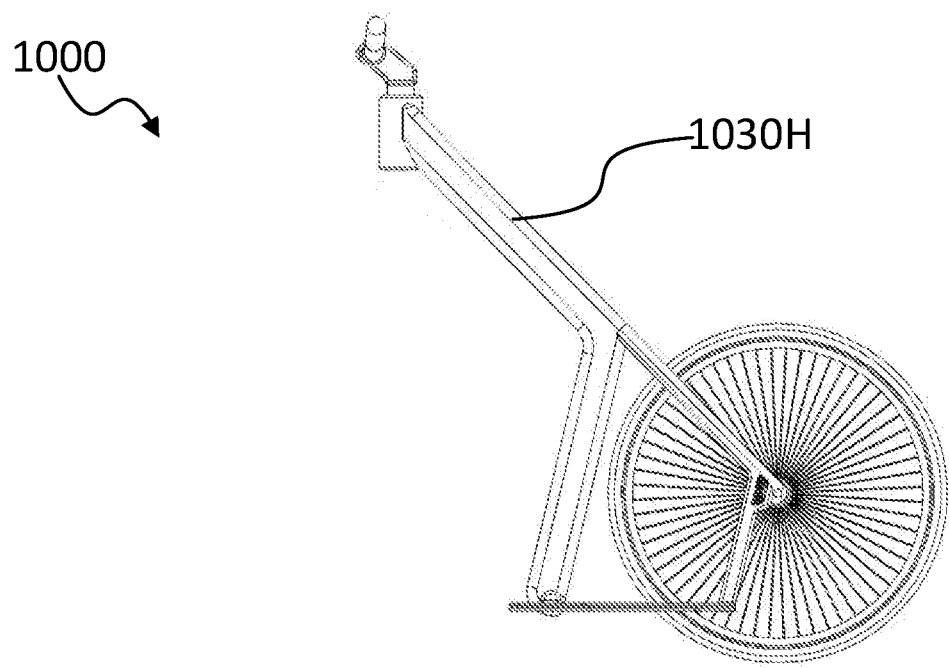
Figure 2I:
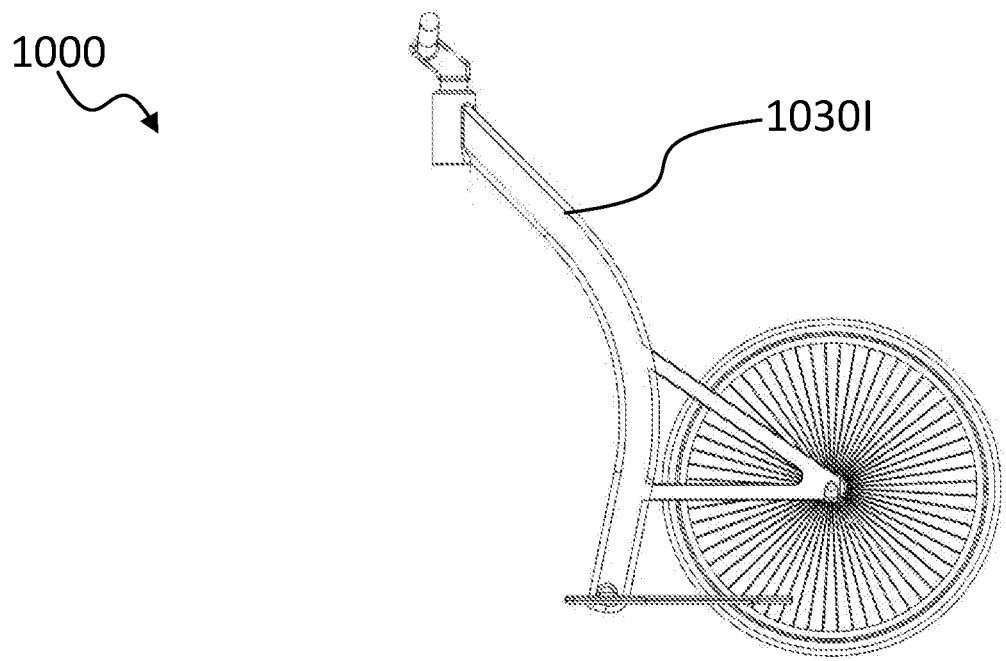
Figure 2J:
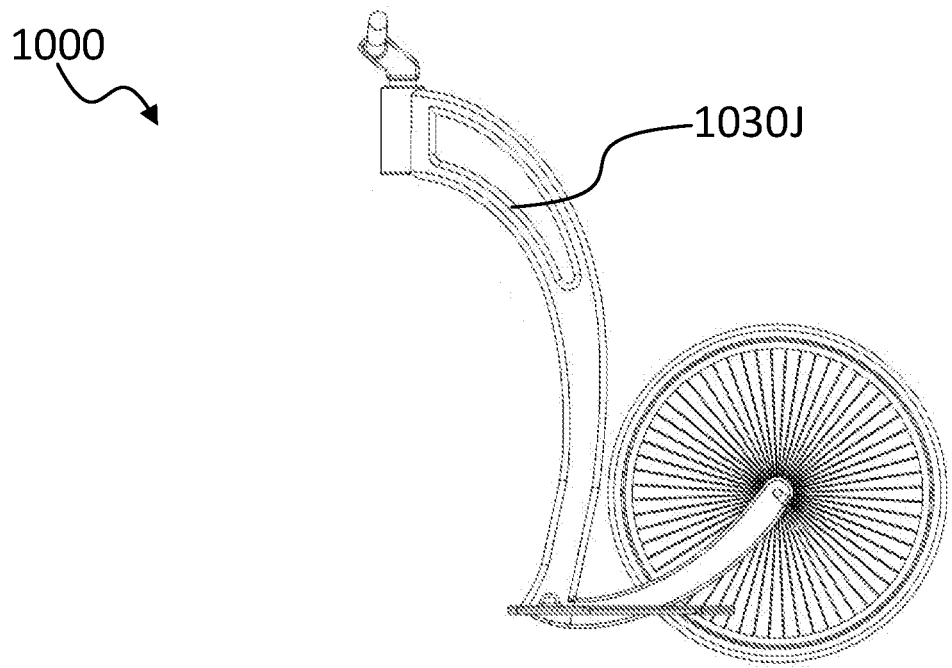
Figure 2K:
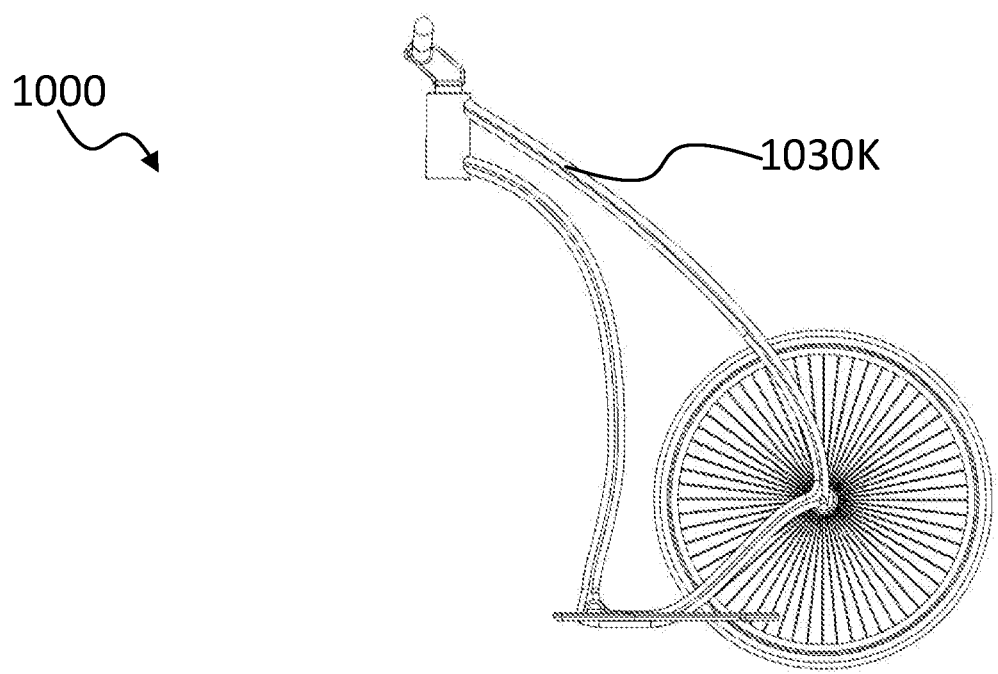
Figure 3A:
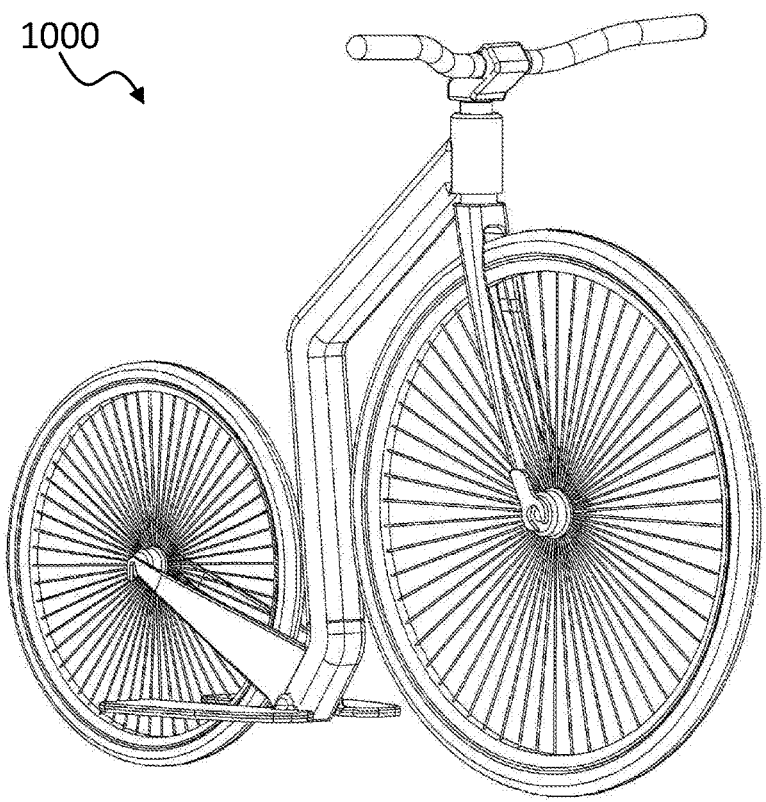
FIGS. 3A and 3B show perspective views of an exemplary two-wheeler vehicle in accordance with the teachings of the present invention.
Figure 3B:
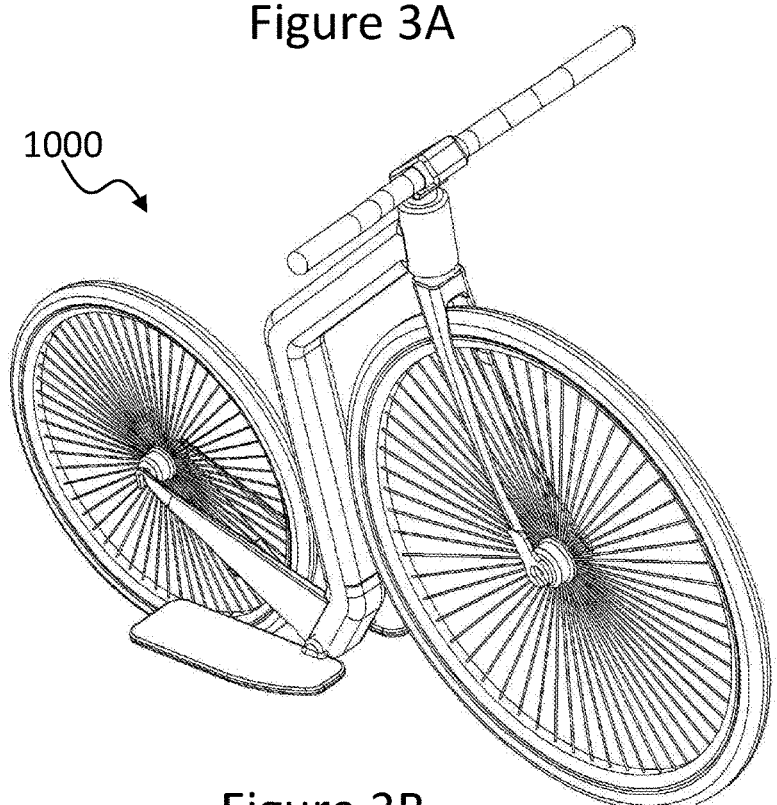
Figures 3C, 3D:
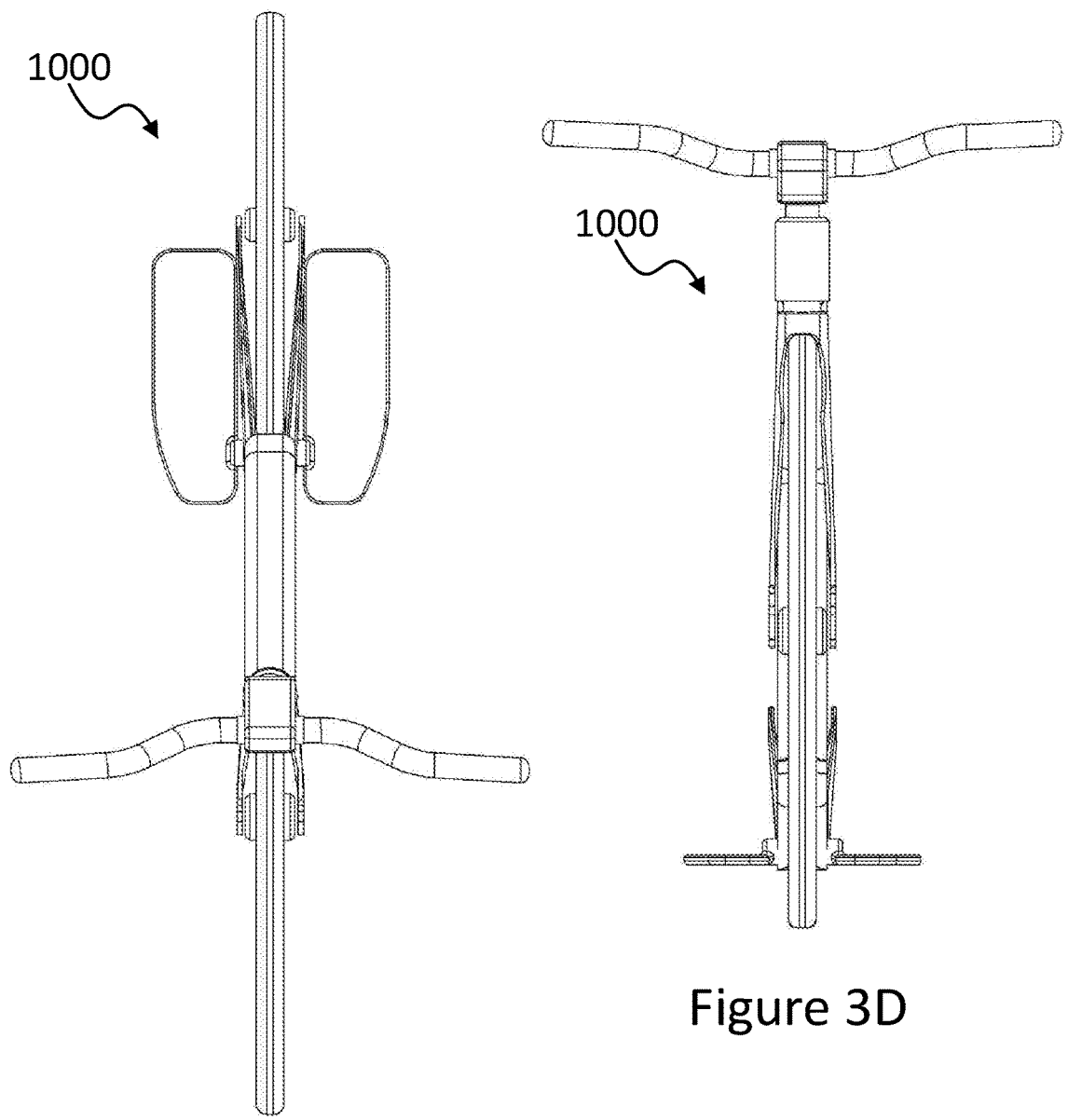
FIGS. 3C and 3D respectively show top and front views of the exemplary two-wheeler vehicle in accordance with the teachings of the present invention.

FIG. 3A and FIG. 3B provide perspective views of the embodiment depicted n FIG. 1A. FIG. 3C and FIG. 3D respectively provide top and front views of the embodiment depicted n FIG. 1A FIGS. 2A to 2K provide views of different design of respective frames 1030A to 1030K in accordance with the teachings of the present invention.

FIG. 2A shows a frame 1030A with a first section that extends from the yoke 1076 to the center of the back wheel 1054. A second section of the frame 1030A extends therefrom to the standing mechanism 1060.

FIG. 2B shows a frame 1030B with a first section that extends from the yoke 1076 to the center of the back wheel 1054. A second section parallel to the first section extends towards the back wheel 1050 and intersects with a third section that extend downwards to the standing mechanism 1060. A fourth section of the frame 1030B extends horizontally from the center of the back wheel 1054 up to the third section.

FIG. 2C shows a frame 1030C with a first section that extends from the yoke 1076 to the center of the back wheel 1054. A second section first extends from the yoke 1076 towards the back wheel 1050 before curving downward towards the standing mechanism 1060. A third section of the frame 1030A extends from the center of the back wheel 1054 up to the standing mechanism 1060.

FIG. 2D shows a frame 1030D with a central section that extends from the yoke 1076 to the standing mechanism 1060 following the general curvature of the front wheel 1040 and of the back wheel 1050. Two sections extend from the center of the back wheel 1050 respectively downwards towards the standing mechanism 1060 and upwards towards the central section.

FIG. 2E shows a frame 1030E with a first section that extends from the yoke 1076 to the center of the back wheel 1054. A second section of the frame 1030E extends from first section downwards to the standing mechanism 1060.

FIG. 2F shows a frame 1030F with a first section that extends from the yoke 1076 to the center of the back wheel 1054. A second section parallel to the first section extends towards the back wheel 1050 and intersects with a third section that extend downwards to the standing mechanism 1060. A fourth section of the frame 1030F extends horizontally from the center of the back wheel 1054 up to the third section.

FIG. 2G shows a frame 1030G with a first section that extends from the yoke 1076 to the center of the back wheel 1054. A second section extend downwards from the first section to the standing mechanism 1060. A third section extends downwardly from the center of the back wheel 1054 to the standing mechanism 1060.

FIG. 2H shows a frame 1030H with a first section that extends from the yoke 1076 to the center of the back wheel 1054. A second section extend downwards from the first section to the standing mechanism 1060. A third section of the frame 1030A extends downwardly from the center of the back wheel 1054 to a backmost extremity of the standing mechanism 1060.

FIG. 2I shows a frame 1030I with a central section that extends from the yoke 1076 to the standing mechanism 1060 following the general curvature of the front wheel 1040. A second section extend horizontally to the central section from the center of the back wheel 1054. A third section of the frame 1030I extends upwards from the center of the back wheel 1054 to the central section.

FIG. 2J shows a frame 1030J with a central section that extends from the yoke 1076 to the standing mechanism 1060 following the general curvature of the front wheel 1040. A second section that extend downwards to the standing mechanism 1060.

FIG. 2K shows a frame 1030K with a first section that extends from the yoke 1076 to the standing mechanism 1060 following the general curvature of the front wheel 1040. A second section extends from the yoke 1076 to the center of the back wheel 1054. A third section extends from the center of the back wheel 1050 towards the standing mechanism 1060.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A two-wheeler vehicle comprising:
    a steerable front wheel having a front wheel diameter $d_f$ of at least 16" or 400 mm, the front wheel defining a front rotation plane when neutrally steered, for advancing in straight line, and defining a front wheel ground contact point;
    a fixed back wheel having a back wheel diameter $d_b$ smaller than or equal to the front wheel diameter, the back wheel defining a back rotation plane coincident with the front rotation plane and defining a back wheel ground contact point, a distance between the back wheel ground contact point and the front wheel contact point being smaller than or equal to (12" or 300 mm+ $\sqrt{d_f \cdot d_b}$);
    a steering mechanism, defining a steering axis intersecting ground at a steering axis ground contact point, wherein a trail distance between the steering axis ground contact point and the front wheel ground contact point is between 5% and 10% of the front wheel diameter, the steering mechanism comprising:
        a fork engaging the front wheel at a front wheel center thereof;
        a yoke; and
        a handlebar mechanically linked to the fork through the yoke for steering the front wheel; and
    a frame, interconnecting the yoke and the back wheel at a back wheel center thereof, comprising:
        a standing mechanism providing at least one footboard, below the back wheel center, extending from the frame laterally.
2. The two-wheeler vehicle of claim 1, wherein the front wheel diameter is at least 30% larger than the back wheel diameter.
3. The two-wheeler vehicle of claim 1, wherein the at least one footboard extends laterally over the back wheel for at least 25 mm or about 1".
4. The two-wheeler vehicle of claim 3, wherein two footboards extend laterally over each side of the back wheel for a passenger can stand thereon.
5. The two-wheeler vehicle of claim 1, wherein the at least one footboard is configured to swivably retract towards the frame.
6. The two-wheeler vehicle of claim 5, wherein the at least one footboard comprises two footboards on respective sides of the back wheel, each being configured to independently retract towards the frame.
7. The two-wheeler vehicle of claim 5, wherein retraction of the at least one footboard is aided by one or more mechanical components.
8. The two-wheeler vehicle of claim 1, wherein a foot resting surface of the at least one footboard is at a maximum ground distance of 300 mm or about 12".
9. The two-wheeler vehicle of claim 1, further comprising one or more motors for driving the back wheel.
10. The two-wheeler vehicle of claim 9, wherein the one or more motors are mounted on the frame.
11. The two-wheeler vehicle of claim 9, wherein the one or more motors are mounted on the back wheel.
12. The two-wheeler vehicle of any one of claims 1 to 11, further comprising one or more motors for driving the front wheel mounted on the front wheel.
13. The two-wheeler vehicle of claim 10, further comprising:
    a battery pack mounted on the frame; and
    one or more motor actuators.
14. The two-wheeler vehicle of claim 13 wherein a center of mass thereof is located between the front wheel ground contact point and the back wheel ground contact point, preferably between the front wheel and the back wheel.
15. The two-wheeler vehicle of claim 13, wherein the battery pack is detachably mounted to the frame.
16. The two-wheeler vehicle of claim 14 or claim 15, wherein the battery pack is distributed in different sections of the frame.
17. The two-wheeler vehicle of claim 14 or claim 15, further comprising a motor controller mounted in one or more locations on the frame for driving the one or more motors.
18. The two-wheeler vehicle of claim 14 or claim 15, wherein the one or more motor actuators are mounted on at least one of the handlebar, the frame and the at least one footboard.
19. The two-wheeler vehicle of claim 1, claim 14 or claim 15, further comprising:
    a brake mechanism comprising at least a magnetic brake on the back wheel; and
    one or more brake actuators.
20. The two-wheeler vehicle of claim 19, wherein the one or more brake actuators are mounted on at least one of the handlebar, the frame and the at least one footboard.
21. The two-wheeler vehicle of claim 19, wherein the brake mechanism comprises a disk brake on the back wheel.
22. The two-wheeler vehicle of claim 1, further comprising a kickstand mounted on the frame.
23. The two-wheeler vehicle of claim 1, wherein a foot resting surface of the at least one footboard is at a maximum ground distance of 150 mm or about 6".

* * * * *